Patented July 1, 1924.

1,499,752

UNITED STATES PATENT OFFICE.

WILLIAM FRASER RUSSELL AND MAURICE KENNARD STEVENS, OF NORWALK, CONNECTICUT, ASSIGNORS TO THE NORWALK TIRE & RUBBER COMPANY, OF NORWALK, CONNECTICUT, A CORPORATION OF CONNECTICUT.

SPLICING OF PNEUMATIC TUBES, ETC.

No Drawing.    Application filed June 23, 1923.  Serial No. 647,372.

*To all whom it may concern:*

Be it known, that we, WILLIAM F. RUSSELL, subject of the King of England, and MAURICE K. STEVENS, a citizen of the United States, residing at Norwalk, county of Fairfield, State of Connecticut, have invented certain new and useful Improvements in Splicing of Pneumatic Tubes, Etc.; and we do hereby declare the following to be a full, clear, and exact description of the invention, such as will enable other skilled in the art to which it appertains to make and use the same.

This invention relates to the joining of rubber surfaces by means of vulcanized rubber so as to provide a vulcanized union between the rubber surfaces, and includes an improved method or process of joining such surfaces, as well as the resulting vulcanized union, and an improved cement adapted for use therein.

The invention is particularly applicable in the splicing of tubes for pneumatic tires, whereby the two ends of the tube are joined together; as well as to the sealing of the two open ends of what are known in the trade as butt-end tubes.

The process of splicing an inner tube as practised at the present time consists essentially of buffing the two ends of the vulcanized tube as it comes from the curing mandrel, coating the buffed ends with a rubber cement, allowing the solvent to evaporate and vulcanizing together the rubber surfaces so obtained by means of a solution of sulphur chloride in a suitable solvent. This process of vulcanization of rubber with sulphur chloride is known as cold vulcanization and is the process which, up to the present time, has generally been employed for splicing together the rubber surfaces. In the formation of an automobile inner tube the two ends of the tube as treated above are united by inserting the one end into the other so that they overlap, thus forming an endless tube.

This method of curing the union or splice with sulphur chloride, although generally used, has nevertheless many serious and troublesome disadvantages. Sulphur chloride is poisonous and strongly corrosive; it has a very injurious effect on the workers and possess a very powerful and unpleasant odor which necessitates the installation of special ventilation; it is very troublesome to handle owing to the great ease with which it attracts moisture from the air and decomposes and this increases the difficulty of producing a uniformly good union and consequently increases the number of defective tubes. In addition to these disadvantages, the corrosive and acid nature of the sulphur chloride tends to crack the surface of the tube adjoining the splice.

Furthermore, the unions formed when sulphur chloride is used are far from satisfactory; such unions do not age well; and the rubber exhibits a tendency to deteriorate and so weakens the union. This is particularly the case in warm weather when the tube in service may become quite hot in the casing. Under such conditions the overlapping surfaces of the splice may easily be pulled apart with the finger and it is not an uncommon thing for the tubes to part at the splice from this cause when they are in use. Even when they do not actually part, sulphur chloride splices are very apt to become loose in places and allow leakage of air from the tubes, this being a very serious defects in many makes of tubes.

Many attempts have been made to overcome these well known objections and disadvantages of sulphur chloride in factory practice. It has been attemped, for example, to vulcanize the surfaces together, by means of rubber cement containing sulphur, using for this purpose complicated steam heated vulcanizing collars and mandrels which are costly to install, troublesome to operate and uncertain in the results attained. Such methods as involve the use of temperatues above e. g. 100° C are also objectionable for the reason that they lead to a pronouced over vulcanization of the tube surrounding the splice, which results in rapid deterioration and consequent weakening of the whole splice or union.

We have found that the drawbacks and difficulties above referred to in present methods of splicing rubber surfaces can be overcome, and the use of sulphur chloride successfully eliminated by the process of the present invention; in addition, the improved process of the present invention presents additional advantages in that the splices produced are characterized by enormous strength and great permanence.

According to the present invention, the rubber surfaces are united together with a self-vulcanizing rubber cement or one which will vulcanize at or below the boiling point of water, namely 100° C.; and the invention presents a novel method of procedure by which this result is accomplished. The process may be carried out automatically during storage, using a self-vulcanizing cement which will vulcanize without the application of any considerable heat; or, if it is desired to accelerate the vulcanization of the splices, this can readily be accomplished by suspending the spliced parts of the tubes or other articles for a few minutes in a tank of hot water or in a warm chamber. By the application of moderate heat to the tubes, it is possible to vulcanize a large number of splics in a few minutes at a very low cost and without any danger of over-vulcanizing the tubes themselves, while nevertheless obtaining a strong and permanent splice.

In the process of the present invention we take avantage of the fact that ultra-accelerators, if introduced by suitable means into rubber-sulfur mixtures, particularly those containing zinc oxide, will effect the complete vulcanization of the rubber either slowly in the cold, or rapidly at higher temperatures below the boiling point of water. Many substances are known as ultra-accelerators but are little used on account of their violent action in vulcanization. For the purposes of the present invention we consider as ultra-accelerators those materials which will effect vulcanization of rubber below the boiling point of water. It is well known that the general run of rubber-sulfur compounds used in rubber manufacturing practice cannot be vulcanized at such low temperatures; so that the vulcanization process of the present invention, using the ultra-accelerators, is carried out at a temperature below that at which over-vulcanization of the inner tube stock itself takes place.

As examples of the ultra-accelerators which may be used in the process of this invention may be mentioned; metallic alkyl-xanthates such as the ethyl- or amyl-xanthates of zinc or lead; the dithiocarbamates or substituted dithiocarbamates of organic bases or of metals such as diethylammonium diethyldithiocarbamate or zinc diethyldithiocarbamate; organic, dissulphides such as the thiuram disulphides or sulphocarboxethyldisulphide; dithioacids and their zinc salts such as zinc dithiopyromucate, etc. These ultra-accelerators may be applied either alone or in conjunction with amines or amine salts. We have found that the action of such ultra-accelerators may frequently be intensified by means of amines or amine salts such as diethylamine or its sulfates.

These ultra-accelerators may be used in a pure state or in a more or less crude form. For example, zinc ethylxanthate may be used in a pure state, but we have found that the more or less impure product can also be used, for example, the more or less impure white or yellow product obtained by precipitating with zinc sulfate a solution of crude sodium or potassium ethyl-xanthate obtained by the interaction of denatured ethyl alcohol, carbon disulfide and caustic soda or potash and water.

These ultra-accelerators, either alone or in combination with each other, may be utilized in suitable rubber mixes, containing suitable proportions of rubber, sulfur and free metallic oxide, such as free zinc oxide or lead oxide, to form cements for use in carrying out the splicing operation. These cements, when used in the splicing of tubes, will produce completely vulcanized splices or unions either in the cold on standing for some days at ordinary room temperature, or immediately on heating for a few minutes in hot water.

The invention will be further illustrated by the following specific illustration, but it is intended and will be understood that this specific description is illustrative and that the invention is not limited thereto.

A suitable cement is prepared from the following compound:

| | |
|---|---|
| Smoked sheets | 100 |
| Zinc oxide | 4 |
| Zinc ethyl-xanthate | 4 |
| Sulfur | 4 |

This compound cannot be mixed commercially on a mill, since it vulcanizes on the mill during mixing and afterwards in the storage bin. Cements can be made for immediate use with this stock, but such cements will not keep for more than a few days, as they are self-vulcanizing. We find it advantageous, in carrying out our invention, to mix the cement stock in two batches, one batch containing the ultra-accelerator, e. g., the zinc ethyl-xanthate, and the other batch containing the zinc oxide and sulfur. For example, the following mixtures may be separately prepared:

| Compound A. | | Compound B. | |
|---|---|---|---|
| Smoked sheets | 52 | Smoked sheets | 48 |
| Zinc ethylxanthate | 4 | Zinc oxide | 4 |
| | — | Sulphur | 4 |
| | 56 | | — |
| | | | 56 |

These mixtures keep indefinitely and can be stored until needed. When the compounds are to be used, equal weights of Compound A and Compound B may be taken and mixed together with gasoline, benzol, or other solvent to form a cement. For example, ½ lb. of A, ½ lb. of B and 1½ gallons of gasoline are suitable and convenient proportions for forming a satisfactory cement. Instead of dissolving both A and B together, separate cements may be made, for example, by dissolving ½ lb of A and ½ lb. of B separately in ¾ gallon of gasoline. These two cements will keep indefinitely, and by mixing them in equal volumes the self-curing cement may be readily and quickly be prepared when desired. In this way the losses of material due to mill-curing and self-vulcanization are overcome and the latter property, i. e., self-vulcanization is put under complete control.

Another method of overcoming the difficulties of self-vulcanization during compounding and storage is to prepare the rubber compound in the usual way, adding all the ingredients except the ultra-accelerator, and make it into a cement into which the ultra-accelerator, or, where possible, its components, may be stirred immediately before using. Substantially the same result may also be obtained by coating the surfaces to be spliced, first with the unaccelerated cement, then with the ultra-accelerator dissolved or applied in any suitable manner. While we have found this method advantageous with some ultra-accelerators, nevertheless it does not yield such good results with zinc ethylxanthate on account of the difficulty of getting the xanthate properly dispersed through the cement.

We have also found that good results may be obtained by keeping the sulphur out of the cement altogether and stirring it in as required prior to using the cement. Or both sulphur and ultra-accelerator may be kept out of the cement and both these ingredients added as required prior to using the cement.

In using the cement for splicing tubes, the tube to be spliced may be prepared in the usual manner, the buffed ends being stretched over the ordinary splicing mandrels such as are used in the sulfur chloride process. The tube ends are now coated with the above described self-vulcanizing cement, allowed to stand long enough to allow the solvent to evaporate and the splice is then closed by inserting the one end into the other, thus causing the ends to overlap each other.

An alternative method of forming the splice is to coat one end with cement A and the other with cement B instead of applying the mixed cement to both ends.

On immersing the splice prepared in either of these ways, and preferably bound with a rubber band, in water of a temperature range from 80 to 100° C. for the short period of 5 to 10 minutes, the vulcanization of the splice will be found complete, producing a union of great strength and permanence, far superior to that which would be obtained with sulfur chloride. Instead of heating the splice to bring about immediate vulcanization, the splice may also be cured by simply allowing it to remain at ordinary room temperature for several days; the warmer the room the quicker the cure. When the splice is allowed to vulcanize itself in this way, the splicing mandrels may be removed and the splice enclosed in a small clamp of suitable shape to keep it flat and under pressure during the process of self-vulcanization.

The following compounds may also be used to advantage in the practice of the invention. These compounds or stocks, which are not self-vulcanizing separately, are prepared of the following composition:

| Compound C. | | Compound D. | |
|---|---|---|---|
| Smoked sheets | 87 | Smoked sheets | 113 |
| Zinc oxide | 30 | Diethylammonium sulphate | 4 |
| Zinc diethyldithiocarbamate. | 8 | Sulphur | 8 |

These compounds do not self cure and can be readily made, handled and kept; but a mixture of equal parts of these compounds is strongly self-vulcanizing. The cements made by dissolving these compounds separately in a suitable solvent do not self-vulcanize, but a cement made by dissolving the compounds separately and mixing the resulting solutions, is self-vulcanizing and can be used in splicing tubes in the same manner as above described. Well vulcanized splices of great strength and good quality are thus obtained.

Our invention may also be applied with good results in the manufacture of butt-end tubes, that is, straight tubes which are sealed at both ends instead of having the ends spliced together to form endless tubes. Heretofore butt-end tubes have usually been sealed by coating the inside of each end with a sulphur containing rubber cement and vulcanizing the ends flat in a platen-press at a high temperature. This process is time-consuming and results in weakening the butt-ends due to overcuring of the tube by the high temperature employed.

According to the process of the present invention the ends are sealed by using one of the self-vulcanizing cements containing an ultra-accelerator, for example, cements such as above described, the sealed ends are then pressed flat under pressure by means of small clips or clamps of suitable design, and they are then suspended in hot water for a few minutes to effect immediate vulcanization, or they may be allowed to vulcanize themselves in storage. By carrying out the sealing of butt-end tubes in this way the evils of over-vulcanization caused by the high temperatures used in the old process are completely overcome, and sealed butt-ends of great strength and durability are obtained.

It will be understood that we do not limit ourselves to the particular examples given, nor to the particular compounds or ultra-accelerators or combinations thereof hereinbefore mentioned. For example, a splicing cement well adapted for use in carrying out the invention can be made with the use of zinc dithiopyromucate instead of the ultra-accelerators referred to in the above compounds. The amount of the zinc dithiopyromucate may for example be 0.6% on the rubber, and a cement made with this ultra-accelerator will cure in a few minutes when the tube is immersed in hot water.

It will also be understood that the invention is not limited to the splicing of tubes and the sealing of butt-end tubes, although it is particularly valuable and advantageous for these purposes. But it is also applicable to the splicing or cementing together of various objects made from vulcanized rubber compounds, and even from other materials as will readily be understood by those skilled in the art.

The advantages which the present invention presents, for example, in splicing of tubes, are not confined alone to the elimination of sulfur chloride and to the overcoming of the drawbacks and difficulties of the present methods of splicing rubber surfaces. We have found that the splices produced by the present invention have none of the disadvantages of those produced by the sulfur chloride method, but are, on the contrary, characterized by enormous strength and great permanence. We have found in the case of automobile tubes that it is impossible to tear the spliced surfaces apart without rupturing the tubes whereas this is comparatively easy in the case of sulfur chloride splices. We have also found that the union produced in accordance with the present invention does not weaken when hot, whereas the union produced with sulfur chloride becomes very weak under the same conditions. Consequently, splices made in accordance with the present invention do not tend to become loose and leaky when in service, for example, in a tire; so that the value of the tubes is greatly enhanced and their life prolonged.

The invention includes not only the improved method of splicing or joining together rubber surfaces but also the improved splices or unions so produced which are characterized by enormous strength and great permanence, and by a substantially integral union between the vulcanized surfaces and compounds united together. We have found, as above pointed out, that automobile tubes spliced in accordance with the present invention had a splice or union of such strength that it was impossible to tear the spliced surfaces apart without rupturing the tubes; and that the union does not weaken when hot and does not tend to become loose and leaky when used in a tire.

We claim:

1. An improved method of joining surfaces which comprises cementing such surfaces together with a self-vulcanizing rubber cement.

2. An improved method of joining surfaces which comprises cementing such surfaces together with a self-vulcanizing rubber cement and permitting the union to stand until vulcanized.

3. An improved process of uniting surfaces which comprises cementing such surfaces together with a self-vulcanizing rubber cement and hastening the vulcanization by the application of heat.

4. An improved method of joining rubber surfaces which comprises cementing such surfaces together with a rubber cement which will vulcanize below 100°C.

5. An improved process of joining rubber surfaces which comprises cementing such surfaces together with a rubber cement which will vulcanize below 100°C., and heating the union.

6. An improved process of uniting rubber surfaces which comprises cementing such surfaces together with a rubber cement which will vulcanize below 100°C. and immersing the union in hot water or its equivalent.

7. An improved method of splicing pneumatic tubes which comprises cementing such tubes together with a rubber cement containing sulphur and an ultra-accelerator.

8. An improved method of splicing pneumatic tubes which comprises cementing such tubes together with a rubber cement containing sulphur, a metallic oxide, and an ultra-accelerator.

9. An improved method of uniting rubber surfaces which consists in cementing such surfaces together with a rubber cement containing sulphur, a metallic oxide, an ultra-accelator and an amine or salt of an amine.

10. An improved method of joining rubber surfaces which comprises cementing such surfaces together with a rubber cement containing sulphur, zinc oxide, and a metallic alkylxanthate.

11. An improved method of splicing pneumatic tubes which comprises cementing such tubes together with a rubber cement containing sulphur, zinc oxide, and zinc ethylxanthate.

12. In improved process of uniting rubber surfaces which comprises cementing such surfaces together with a rubber cement containing sulphur, a metallic oxide, and an ultra-accelerator, and heating the union.

13. An improved process of uniting rubber surfaces which comprises cementing such surfaces together with a rubber cement containing sulphur, a metallic oxide, and an ultra-accelerator, and immersing the union in hot water or its equivalent.

14. An improved process of uniting rubber surfaces which comprises preparing separately two rubber cements which are self-vulcanizing when mixed and cementing such surfaces together with the mixed cements.

15. An improved process of uniting rubber surfaces which comprises preparing separately two rubber cements which are self-vulcanizing when mixed, coating one surface with one cement, coating the other surface with the other cement and closing the union.

16. An improved process of uniting rubber surfaces which comprises preparing separately two rubber cements which will vulcanize below 100° C. when mixed and cementing such surfaces together with the mixed cements.

17. An improved process of uniting rubber surfaces which comprises preparing separately two rubber cements which will vulcanize below 100° C. when mixed, coating one surface with one cement, coating the other surface with the other cement and closing the union.

18. An improved process of uniting rubber surfaces which comprises cementing such surfaces together with a sulphur-containing rubber cement to which an ultra-accelerator is separately added to render the cement vulcanizable below 100° C. and heating the union in hot water or its equivalent.

19. An improved process of uniting rubber surfaces which comprises cementing such surfaces together with a rubber cement containing an ultra-accelerator, to which sulphur is separately added to render the cement vulcanizable below 100° C. and heating the union in hot water or its equivalent.

20. An improved process of uniting rubber surfaces which comprises cementing such surfaces together with a rubber cement to which sulphur and an ultra-accelerator have been separately added to render the cement vulcanizable below 100° C. and heating the union in hot water or its equivalent.

21. An improved process of uniting rubber surfaces which comprises coating such surfaces with a rubber cement containing sulphur, then with an ultra-accelerator to render the cement coating vulcanizable below 100° C., closing the union and heating it in hot water or its equivalent.

22. An improved process of uniting rubber surfaces which comprises coating one surface with a rubber cement containing sulfur, coating the other surface with an ultra accelerator, then closing the union and heating it in hot water or its equivalent.

23. An improved process of uniting rubber surfaces which comprises coating such surfaces with a rubber cement containing sulfur, separately applying an ultra accelerator to render the cement coating vulcanizable below 100° C., closing the union and heating it in hot water or its equivalent.

24. A composite sulphur vulcanized rubber product having vulcanized rubber surfaces united together with a self-vulcanizing cement containing an ultra accelerator.

25. A butt-end inner tube having the ends sealed with a self-vulcanized cement containing sulphur and an ultra accelerator.

26. An inner tube having the ends of the tube spliced together with a self-vulcanized cement containing sulphur and an ultra-accelerator.

27. A vulcanized rubber joint vulcanized at a temperature lower than 100° C. and free from sulphur chloride or its reaction products.

28. An improved method of splicing pneumatic tubes, which comprises cementing the ends of the tube together with a rubber cement which will vulcanize at a temperature below 100° centigrade, and heating the splice in hot water or its equivalent.

In testimony whereof we affix our signatures.

WILLIAM FRASER RUSSELL.
MAURICE KENNARD STEVENS.